(12) United States Patent
Penner et al.

(10) Patent No.: US 7,762,606 B2
(45) Date of Patent: Jul. 27, 2010

(54) ONE PIECE INSTRUMENT PANEL EXHIBITING A TWO GRAIN, TWO PART APPEARANCE WITH SURFACE DEFINED SEPARATION GROOVE AND ASSOCIATED METHOD FOR CREATING A MASTER MODEL FOR IN TURN MAKING A PRODUCTION MOLD FOR PRODUCING MULTIPLE INSTRUMENT PANELS ACCORDING TO A SLUSH MOLD PROCESS

(75) Inventors: Benjamin W. Penner, Ann Arbor, MI (US); Kelly S. Barton, Lexington, KY (US); Niwa Seisuke, Bardstown, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/013,026

(22) Filed: Jan. 11, 2008

(65) Prior Publication Data

US 2009/0179451 A1     Jul. 16, 2009

(51) Int. Cl.
    *B62D 25/14*      (2006.01)
(52) U.S. Cl. ...................................................... 296/70
(58) Field of Classification Search ................. 296/70; 180/90
See application file for complete search history.

(56) References Cited

U.S. PATENT DOCUMENTS 4,779,390 A * 10/1988 Repper et al. .................. 52/222
5,316,359 A * 5/1994 Lansinger ....................... 296/70
5,413,814 A    5/1995 Bowen et al.
5,447,328 A * 9/1995 Iannazzi et al. ............ 280/728.3
5,468,039 A * 11/1995 Matsumoto et al. ........... 296/70
5,487,800 A * 1/1996 Ash ................................ 156/87
5,492,663 A    2/1996 Greenwald et al.
5,700,050 A * 12/1997 Gonas ..................... 296/187.05
5,871,229 A * 2/1999 Saito ............................ 280/732
6,004,498 A * 12/1999 Fujii et al. ..................... 264/255
6,129,378 A    10/2000 Goto et al.
6,726,239 B1 * 4/2004 Teranishi et al. ......... 280/728.3
6,765,546 B2    7/2004 Akamine et al.
2006/0208389 A1 * 9/2006 Nyssen ......................... 264/126

FOREIGN PATENT DOCUMENTS

| JP | 9071691 | | 3/1997 |
| JP | 10128775 | | 5/1998 |
| JP | 10128775 A | * | 5/1998 |
| JP | 2002336747 | | 11/2002 |

\* cited by examiner

*Primary Examiner*—H Gutman
(74) *Attorney, Agent, or Firm*—Gifford, Krass, Sprinkle, Anderson & Citkowski, P.C.

(57) ABSTRACT

An instrument panel with a one piece body constructed of a thermoformed material and exhibiting first and second visually differentiable surface patterns. An associated process includes the creation of an instrument panel, such as through the use of a clamshell slush mold, and including the formation of a groove between the surface patterns which exhibits a visually appealing and rounded cross sectional profile.

8 Claims, 3 Drawing Sheets

ONE PIECE INSTRUMENT PANEL EXHIBITING A TWO GRAIN, TWO PART APPEARANCE WITH SURFACE DEFINED SEPARATION GROOVE AND ASSOCIATED METHOD FOR CREATING A MASTER MODEL FOR IN TURN MAKING A PRODUCTION MOLD FOR PRODUCING MULTIPLE INSTRUMENT PANELS ACCORDING TO A SLUSH MOLD PROCESS

FIELD OF THE INVENTIONS

An instrument panel produced as one piece and exhibiting the characteristics of a multi-piece panel with integrated separation groove. Also, a master model for creating a production mold for in turn producing multiple instrument panels according to such as a slush mold procedure is disclosed.

BACKGROUND OF THE INVENTIONS

Instrument panels exhibiting two different grain patterns are known in the art. While such panels typically include multiple pieces assembled together (and typically suffering from both fit and finish and tolerancing issues) additional attempts have been made to replicate the appearance of a multiple parts by employing a single piece.

An example of a one-piece trim panel is incorporated into the 2006 Toyota Solara. A portion of a side of the instrument panel has two portions which are painted different colors and exhibit different grain patterns. A knife blade is employed for establishing a groove between the distinguishable grain patterns and, in practice, imparts undesirable sharp corners in the tool which greatly reduces tool life and increases the chance for tool cracking. The final parts produced also exhibit large radius' at the mating of the two portions, and which does not match current desired styling trends of minimal radius'.

Other examples are also known of style lines or grooves incorporated into an existing surface of a vehicle dash or panel. Such lines or grooves are typically for styling purposes and usually do not separate visually differentiable surface grains/patterns or impart a separate part appearance.

SUMMARY OF THE INVENTIONS

An instrument panel produced as one piece and exhibiting the characteristics of a multi-piece panel, such being defined as two, three or more individual portions each mimicking a visually differentiable grain pattern. A separation groove establishes a boundary between the grain patterns and, by virtue of an associated mold process employed, exhibits the characteristics of two separate panels at each desired boundary location, these coming together with minimal established radius and groove to create the appearance of a minimal dimensioned gap.

The instrument panel exhibits a soft-touch skin produced by such as a slush molding process and in which a substrate and a thermoplastic urethane (TPU) as well as potentially a TPO, PVC or other skin is placed in spaced apart fashion within a clamshell mold, between which is injected a volume of a foam filler material. The method also includes first creating a master model exhibiting different grains and which are precisely joined in a flush fitting fashion. A narrow flat groove appearance defining the grain boundary is established, such as through the use of base applied silicone and the model in turn is used in creating a final production mold.

BRIEF DESCRIPTION OF THE INVENTIONS IN THE DRAWINGS

Reference will now be made to the attached drawings, when read in combination with the following detailed description, wherein like reference numerals refer to like parts throughout the several views, and in which.

DETAILED DESCRIPTION OF THE INVENTIONS IN THE PREFERRED EMBODIMENTS

Figure 1:
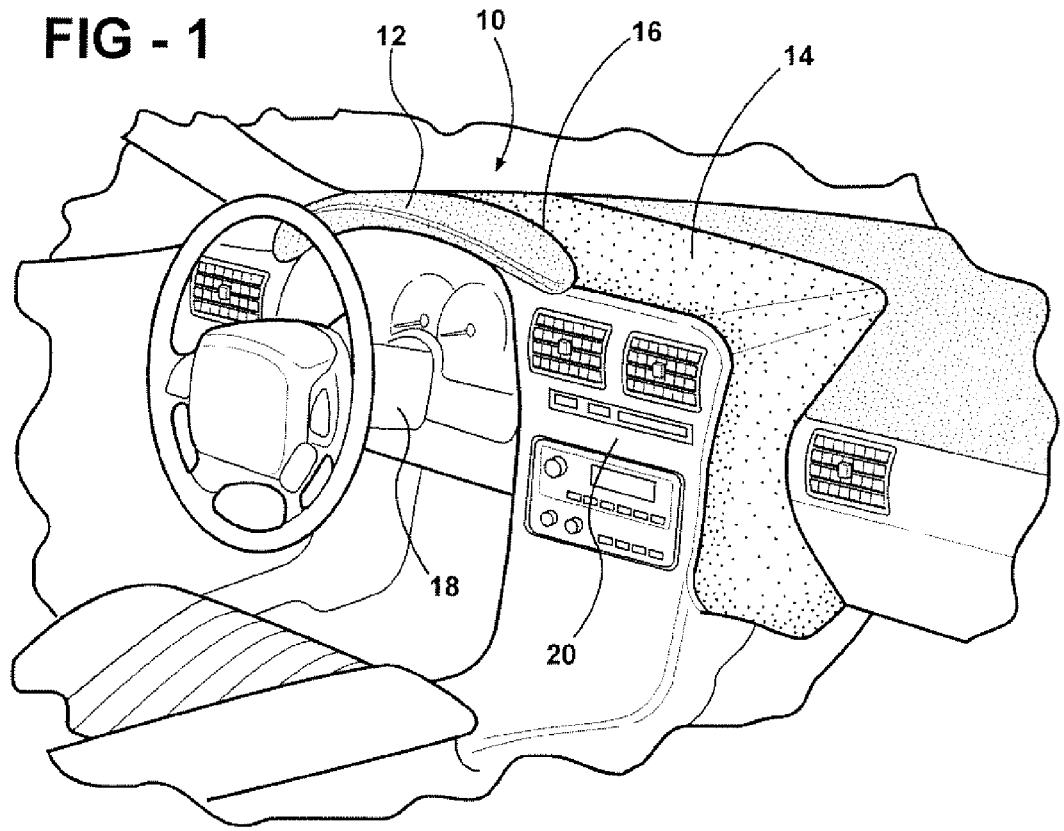
FIG. 1 is an environmental view of an instrument panel exhibiting a one piece construction with first and second visually differentiable grain patterns separated by a groove exhibiting a rounded sectional profile.

Referring to FIG. 1, an environmental view is generally shown at 10 of an instrument panel exhibiting a one piece construction with first 12 and second 14 visually differentiable surfaces and which are separated by a boundary defining groove 16 and which, as will be subsequently described in additional detail, establishes a rounded/contoured and aesthetically appealing profile. For purposes of ease of illustration, FIG. 1 presents one very simplified example of an instrument panel design, including a first hood portion located proximate to the steering wheel column (and corresponding to the first surface 12), with a second surrounding panel portion (corresponding with the second surface 14) encircling the hood portion.

Beyond what is illustrated in FIG. 1, other instrument panel configurations are contemplated, such as based upon the specific vehicle design or model, and can include the hood portion (first surface 12) extending further along boundary defining sides of the instrument panel relative to the vehicle steering column, shown at 18, as well as over and around the IP instrument panel mounted portion of the center console 20. In such further configurations, the associated groove 16 is extended to define a boundary between the desired hood surface and the second (surrounding) surface. According to additional desired variants, the first 12 and second 14 surfaces may each further represent a faux appearing grain pattern (reference also being made to the subsequently described process for creating the article), and can also exhibit other natural or artificial appearing surfaces according to the preferences of the designer.

The instrument panel 10 is again produced as one piece, from such as a thermoplastic material and in non-limiting variants exhibits the characteristics of a two piece panel, mimicking first and second visually differentiable grain patterns. The separation groove 16 again establishes a boundary between the grain patterns and, by virtue of the associated mold process employed, exhibits a rounded sectional profile.

Figure 2:
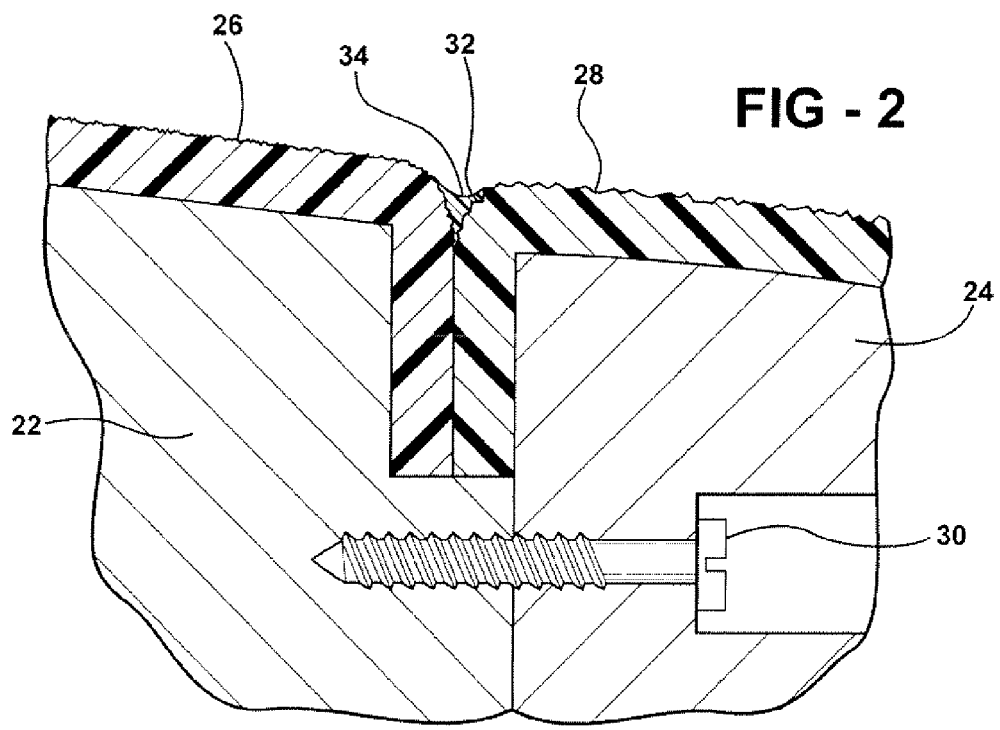
FIG. 2 is a plan cutaway of a master model created as a first step in a process for producing one piece instrument panels according to such as a slush molding process.

Referring now to FIG. 2, a plan cutaway is shown of a master model created as a first step in a process for producing a one piece instrument panel 10 according to such as a clamshell slush molding process. She master model includes a first form 22 and a second form 24, these being constructed from either wood or another suitable material and being machined or otherwise formed to precise dimensions corresponding to the desired surfaces 12 and 14 associated with the instrument panel.

A first grain exhibiting material 26 is applied over an exposed surface of the first form 22 and a second visually differentiable grain exhibiting material 28 is applied over the second form 24. Ends of the materials 26 and 28 are provided such as in roll from and overlap along a central seam and which are sandwiched by a fixing screw 30 for drawing together and securing the forms and associated grain coverings in a flush fitting fashion. The grain materials 26 and 28 can also be otherwise secured (such as through the use of chemical adhesives or the like) along other surface and/or edge defined locations associated with the forms 22 and 24.

A small amount of a filler material, such as a silicone 32, is applied at the base of the joining boundary between the forms 22 and 24 and associated grain materials and in order to create an exterior facing and inwardly rounded radius', at 34. The profile 34 corresponds to a flattened appearance to the eventual groove (see again at 16 in FIG. 1) in the mold produced instrument panel 10.

Figure 3:
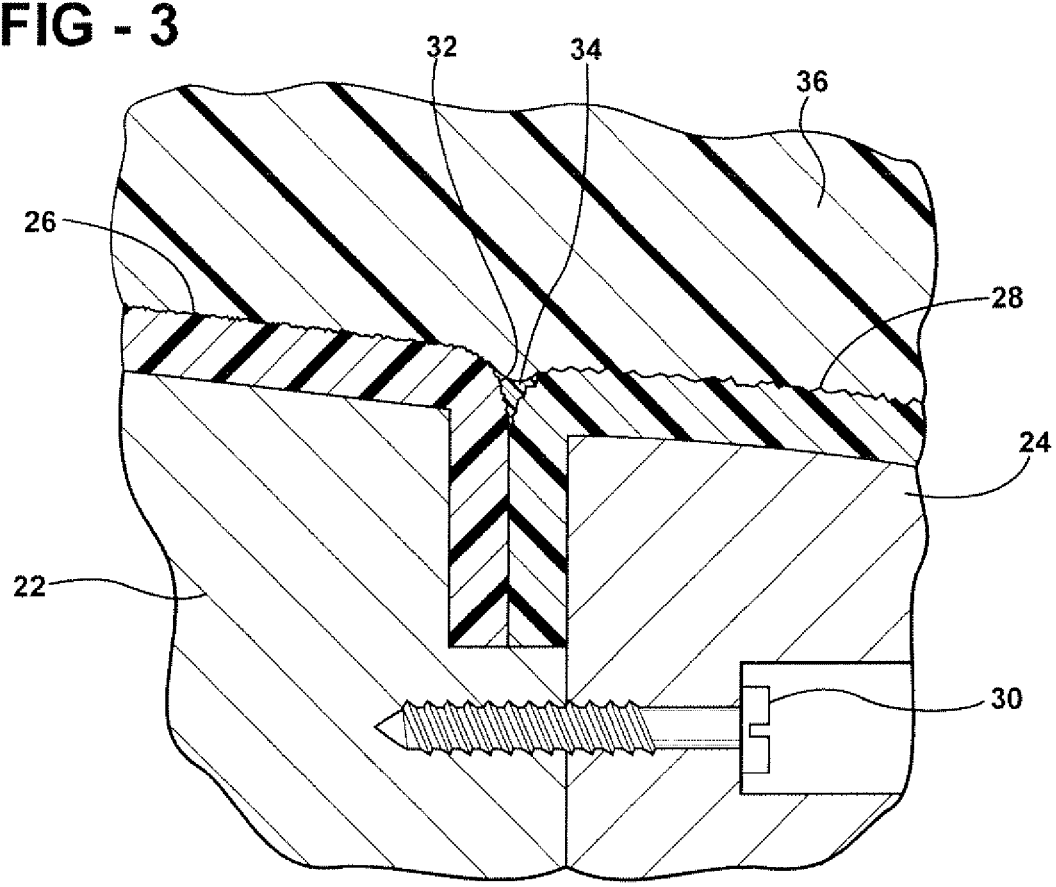
FIG. 3 is a succeeding illustration of the master model in FIG. 2 employed in creating a final and three dimensional production mold, such as through a multi-step buildup of a silicone impression of the master model and which is followed by a nickel electroforming process.

FIG. 3 is a succeeding illustration of the master model in FIG. 2 employed in creating a final and three dimensional production mold, such as through a multi-step buildup of a silicone impression, see material layer 36, upon the surface of the master model, again referenced by grain roll surfaces 26 and 28 with inter-disposed and boundary defining rounded profile 34. The production mold part produced, this corresponding to the exposed face of the built-up material layer 36 subsequently can undergo such as a nickel electroforming process.

Figure 4:
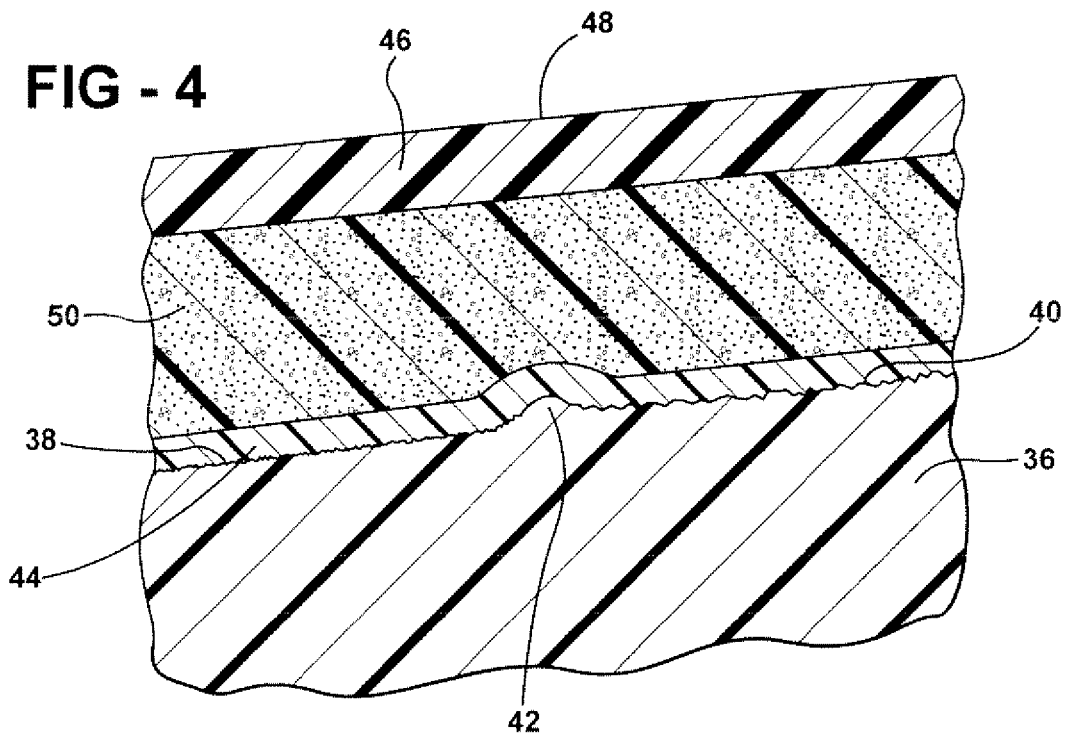
FIG. 4 is an illustration of the production mold in FIG. 3, inverted, and employed in a clamshell mono-foam mold for creating a finished panel.

FIG. 4 is an illustration of the final production mold (layer 36) in FIG. 3, inverted, and employed in such as a clamshell mono-foam mold (not shown). It is generally understood that a slush mold is employed to produce a skin component, with an injection mold making the substrate, the eventual mono-foam holding both the skin and substrate and injects foam between them to create the final part, for creating a finished instrument panel. Consistent with the description of the master model in FIG. 2 the production mold exhibits a first pattern 38 (mirroring the first grain or other decorative pattern 26 in FIG. 3), a second pattern 40 (mirroring the second grain or other decorative pattern 28) and a rounded and boundary defining convex portion 42.

The construction of the clam shell mold is further known in the art and typically employs first and second hingedly or otherwise assembleable halves which define a recessed area therebetween. The production mold 36 is placed within a base of the lower mold half and the assembled upper mold establishes an interior surface which corresponds to an eventual thickness of the instrument panel produced.

The instrument panel may further exhibit a soft-touch skin, this provided through the use of a thermoplastic urethane (TPU), it being understood that additional materials not limited to TPO (Thermoplastic Elastomer Polyolefin), PVC (Poly Vinyl Chloride), PU (Polyurethane) Spray Coating, etc, can be incorporated into such as a slush molding process (or any other skin forming process, PU spray etc., and which produces instrument panel components with exhibiting a skin with a soft touch material) and in which a substrate and the thermoplastic urethane (TPU) skin 44 is formed upon the visually differentiating surfaces 38 and 40 and inter disposed contoured boundary 42 of the production mold 36. In one non-limiting and known practice, the injected plastisol (e.g. TPU skin 44) fills the heated surfaces of the mold and is typically allowed to dwell until a desired thickness has gelled on the inner surfaces (38, 40 and 42) of the mold, the remaining liquid typically being drained back into a reservoir for subsequent reuse.

A further layer 46 of a substrate material (such as again a suitable thermoplastic or other desired base material) is either formed or pre-placed in spaced apart fashion within the upper clamshell mold, and such that its upper surface 48 defines the upper interior boundary of the upper clamshell mold. Following this, a volume of a foam filler material 50 is injected between the skin 44 and substrate 46. Upon curing and removal, the resultant part replicates the appearance of the master model.

In one application, the mold with the gelled inner coating is typically placed in an oven, where the plastisol and associated substrate and tiller layers are permitted to fuse or cure, thus retaining the design of its inner surfaces (38, 40, 42) on the corresponding exterior surface of the skin layer 44. It is also envisioned that molds of electroformed copper or find sand-cast aluminum can be employed in slush molding processes and it is further envisioned, in intricate forming operations. A two pour method can also be employed, and by which a cold mold surface is filled with the TPU skin defining material, this subsequently being vibrated to remove bubbles, and following which a second injection of the TPU material overlays a pre-existing and remaining thin film of plasticized material. In this way, the plastisol is not permitted a chance to gel before flowing into the mold extremities.

Figure 5:
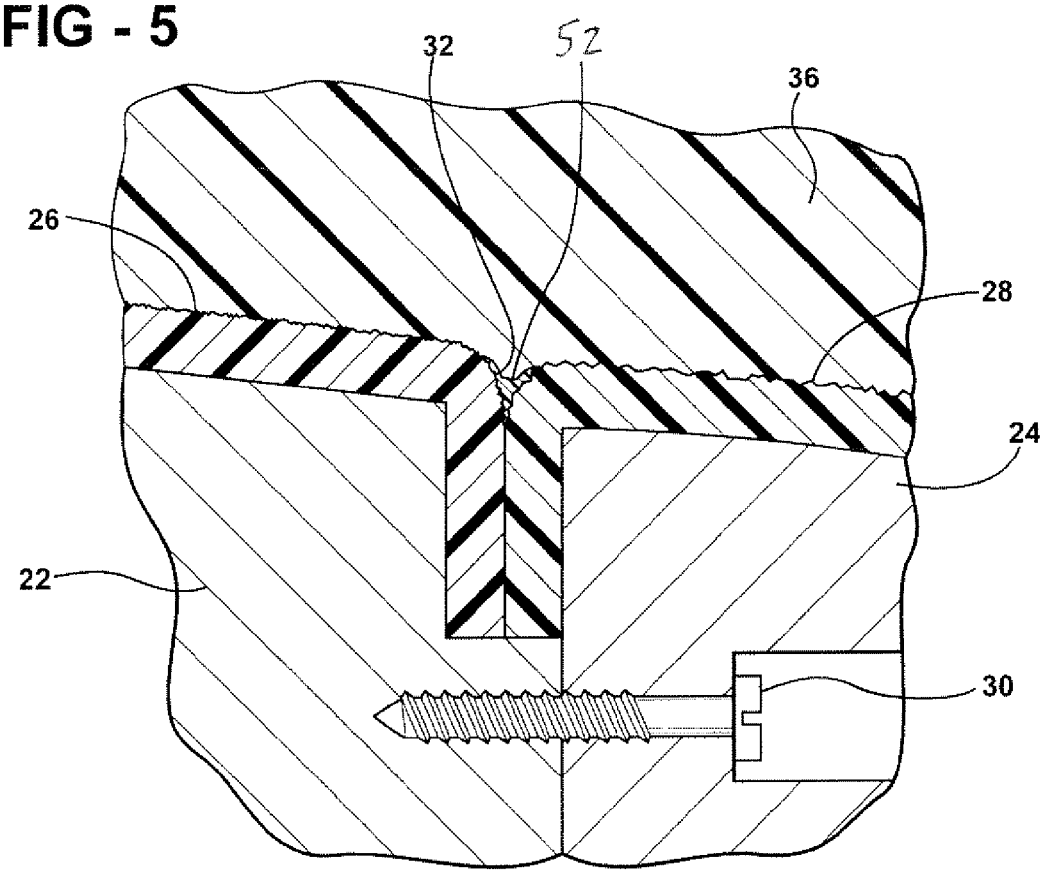
FIG. 5 is an illustration similar to FIG. 2 of a further variant and in which the separation groove is reconfigured in cross section to exhibit a recess plateau configuration.
Figure 6:
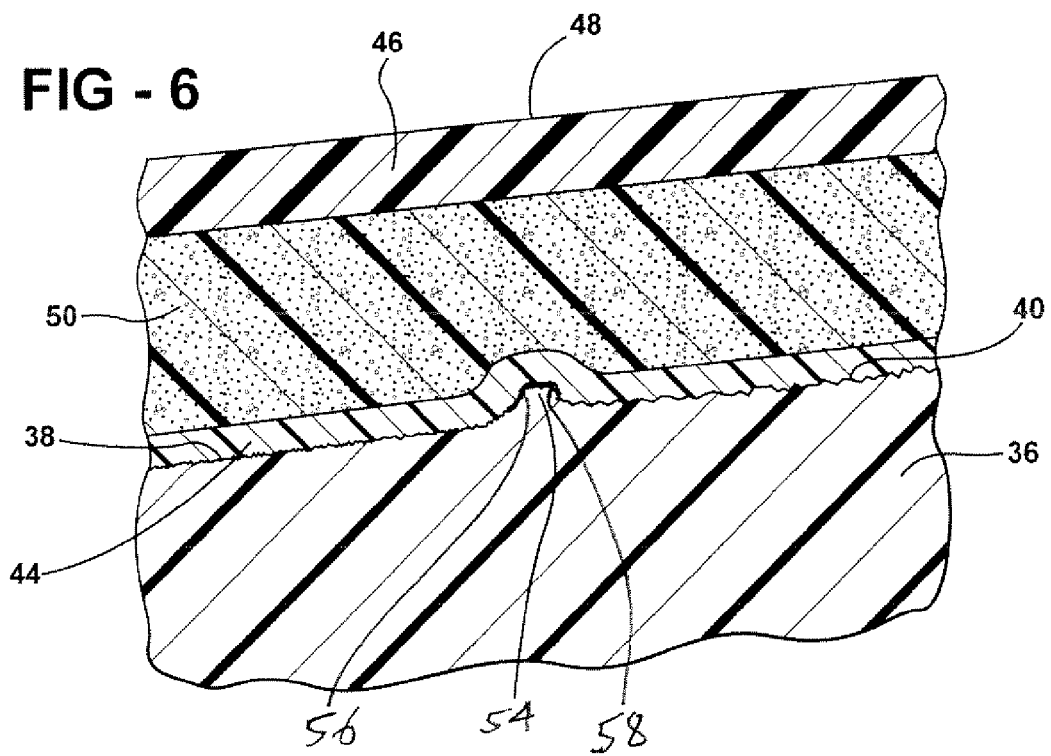
FIG. 6 is an illustration similar to FIG. 4 of an eventual panel configuration exhibiting the groove configuration of FIG. 5.

Referring finally to FIGS. 5 and 6, illustrated are a pair of views similar to the embodiment of FIGS. 2 and 4, and illustrating a further variant in which the separation groove is reconfigured in cross section and in order to exhibit a recess flattened or plateau configuration between angled or curved sides, as generally referenced at 52 in the mold illustration of FIG. 5 and further at 54 in reference to the eventual molded part profile in FIG. 6. The mating edges (se at 56 and 58 in FIG. 6) between the plateau central recess and the bounding edges of the grain patterns 38 and 40 are typically rounded or contoured, however it is also understood that these edge profiles can also be more distinct.

As with the narrow groove variant 34 of the embodiment of FIGS. 2-4, the groove configuration 54 (FIG. 6) provides a similar desired appearance of minimal gap between grain surfaces (e.g. again shown at 38 and 40 in the resultant product of FIG. 6). As further previously described, a suitable panel component can include any plurality, such as two, three or more, distinct surface grain textures/patterns, with a suitable groove configuration being employed as a boundary.

Having described our invention, other and additional preferred embodiments will become apparent to those skilled in the art to which it pertains, and without deviating from the scope of the appended claims.

We claim:

1. A vehicle instrument panel providing the appearance of being formed of two different components and comprising:
   a body having a surface covered with a single coating constructed of a uniform and thermoformed material and including a hood portion extending at least above a steering column associated with a vehicle, a second portion surrounding the hood portion and which is visually differentiable from said hood portion; and a groove defining an extending boundary between said hood portion and said second portion and exhibiting an inwardly radiused profile.

2. The invention as described in claim 1, said body having a specified shape and size with said first and second portions mimicking first and second faux grain patterns.

3. The invention as described in claim 2, said body further comprising a skin, a substrate layer, and an intermediate foam filler material.

4. The invention as described in claim 3, said skin further comprising a thermoplastic urethane material.

5. An instrument panel, comprising:
a body having a surface covered with a single coating and formed of a uniform material including a first portion having a first grain surface;
a second portion having a second surface visually differentiable from said first surface;
said body exhibiting a specified shape and size with said first portion defining a hood portion extending at least above a vehicle steering column, said second portion encircling the hood portion; and
an inwardly radiused profile extending between said first portion and said second portion;
wherein said body has an appearance of being formed of two different components.

6. The invention as described in claim 5, said body having a specified shape and size with said first and second portions mimicking first and second faux grain patterns.

7. The invention as described in claim 6, said body further comprising a skin, a substrate layer, and an intermediate foam filler material.

8. The invention as described in claim 7, said skin further comprising a thermoplastic urethane material.

* * * * *

UNITED STATES PATENT AND TRADEMARK OFFICE
CERTIFICATE OF CORRECTION

PATENT NO. : 7,762,606 B2 Page 1 of 1
APPLICATION NO. : 12/013026
DATED : July 27, 2010
INVENTOR(S) : Benjamin Warren Penner et al.

It is certified that error appears in the above-identified patent and that said Letters Patent is hereby corrected as shown below:

Column 3 line 9 replace "She" with --The--

Column 4 line 25 replace "tiller" with --filler--

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,762,606 B2
APPLICATION NO. : 12/013026
DATED : July 27, 2010
INVENTOR(S) : Benjamin Warren Penner et al.

It is certified that error appears in the above-identified patent and that said Letters Patent is hereby corrected as shown below:

On the Title page, Item (75), replace the name of the inventor "Niwa Seisuke" with --Seisuke Niwa--

Signed and Sealed this
Twenty-third Day of July, 2013

Teresa Stanek Rea
*Acting Director of the United States Patent and Trademark Office*